(12) United States Patent
Saar et al.

(10) Patent No.: US 12,241,539 B2
(45) Date of Patent: Mar. 4, 2025

(54) GEARING HAVING A HOUSING AND A SHAFT UNIT

(71) Applicant: SEW-EURODRIVE GMBH & CO. KG, Bruchsal (DE)

(72) Inventors: Steffen Saar, Harthausen (DE); Dietmar Strauß, Bruchsal (DE); Christoph Ruppaner, Kraichtal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 100 days.

(21) Appl. No.: 18/032,677

(22) PCT Filed: Oct. 5, 2021

(86) PCT No.: PCT/EP2021/077462
§ 371 (c)(1),
(2) Date: Apr. 19, 2023

(87) PCT Pub. No.: WO2022/084030
PCT Pub. Date: Apr. 28, 2022

(65) Prior Publication Data
US 2023/0392680 A1    Dec. 7, 2023

(30) Foreign Application Priority Data
Oct. 20, 2020    (DE) .................. 102020006453.1

(51) Int. Cl.
*F16H 57/022* (2012.01)
*F16C 19/38* (2006.01)
(Continued)

(52) U.S. Cl.
CPC .......... *F16H 57/022* (2013.01); *F16C 19/38* (2013.01); *F16C 35/063* (2013.01); *F16H 57/023* (2013.01); *F16H 2057/0221* (2013.01)

(58) Field of Classification Search
CPC ................. F16H 57/022; F16H 57/023; F16H 2057/0221; F16C 19/38; F16C 35/063
See application file for complete search history.

(56) References Cited

U.S. PATENT DOCUMENTS 1,894,927 A *   1/1933   Schmitter ........... F16H 57/0421
                                                            74/420
2,605,148 A     7/1952   Shoup
(Continued)

FOREIGN PATENT DOCUMENTS

CN      201133351 Y      10/2008
CN      201225284 Y       4/2009
(Continued)

OTHER PUBLICATIONS

International Report on Patentability issued in corresponding International Application No. PCT/EP2021/077462 dated Apr. 13, 2023, pp. 1-12, English Translation.
(Continued)

*Primary Examiner* — William C Joyce
(74) *Attorney, Agent, or Firm* — Carter, DeLuca & Farrell LLP (57) ABSTRACT

A gearing includes a housing and a shaft unit.
The housing includes a lower part and an upper part placed on the lower part.
The lower part has at least one, e.g., semi-cylindrical, cut-out, e.g., a bearing holder, for holding the shaft unit.
The upper part has at least one second, e.g., semi-cylindrical, cut-out, e.g., a bearing holder, which together with the cut-out of the lower part forms a complete and/or cylindrical bearing holder.
The shaft unit has a shaft onto which first and second bearings are mounted, the outer rings of which are braced with respect to one another. The shaft unit has first shim washer(s) for adjusting the bracing, e.g., the bearing tension.
(Continued)

The gearing has second shim washer(s) for adjusting the axial position of the shaft unit.

30 Claims, 12 Drawing Sheets

(51) Int. Cl.
*F16C 35/063* (2006.01)
*F16H 57/023* (2012.01)

(56) References Cited

U.S. PATENT DOCUMENTS

| | | |
|---|---|---|
| 3,112,965 A | 12/1963 | Popiel |
| 2016/0290475 A1 | 10/2016 | Verdyck |
| 2018/0266535 A1 | 9/2018 | Uhlenbrok |

FOREIGN PATENT DOCUMENTS

| | | |
|---|---|---|
| CN | 106321740 A | 1/2017 |
| DE | 2338175 A1 | 3/1974 |
| DE | 102004024003 A1 | 2/2006 |
| DE | 102007058904 A1 | 6/2009 |
| DE | 102007062363 A1 | 6/2009 |
| DE | 102010021725 A1 | 12/2011 |
| DE | 102013226519 A1 | 6/2015 |
| DE | 102015200741 A1 | 7/2016 |
| JP | 2000074051 A | 3/2000 |

OTHER PUBLICATIONS

International Search Report issued in corresponding International Application No. PCT/EP2021/077462 dated Jan. 20, 2022, pp. 1-2, English Translation.

* cited by examiner

GEARING HAVING A HOUSING AND A SHAFT UNIT

FIELD OF THE INVENTION

The present invention relates to a gearing having a housing and a shaft unit

BACKGROUND INFORMATION

In certain conventional systems, a gearing has a housing in which the bearings of a shaft of the gearing are accommodated.

German Patent Document No. 10 2013 226 519 describes a shaft bearing assembly for a wind turbine gearbox.

A gearbox is described in German Patent Document No. 10 2007 058 904.

A method for adjusting the backlash of a transmission is described in German Patent Document No. 10 2015 200 741.

A rolling bearing is described in German Patent Document No. 10 2010 021 725.

A bearing arrangement is described in Chinese Patent Document No. 201225284.

A device on screw compressors is described in German Patent Document No. 23 38 175.

A bearing arrangement is described in Chinese Patent Document No. 201133351.

A preloaded bearing unit is described in U.S. Pat. No. 2,605,148.

A bearing device is described in Japanese Patent Document No. 2000-74051.

SUMMARY

Example embodiments of the present provide a gearing.

According to an example embodiment of the present invention, a gearing includes a housing and a shaft unit. The housing has a lower part and an upper part placed on the lower part. The lower part has at least one, e.g., semi-cylindrical, cut-out, e.g., a bearing holder, for holding the shaft unit. The upper part has at least one second, e.g., semi-cylindrical, cut-out, e.g., a bearing holder, which, together with the cut-out of the lower part, forms a complete and/or cylindrical bearing holder. The shaft unit has a shaft onto which a first and a second bearing are mounted, the outer rings of which are braced with respect to one another, and the shaft unit has one or more first shim washers for adjusting the bracing, e.g., the bearing tension. The gearing has one or more second shim washers for adjusting the axial position of the shaft unit.

The bearing tension of the bearings of the shaft of the shaft unit can be implemented independently of the axial positioning of the shaft unit relative to the pinion. Thus, the contact pattern of the driving angular gear stage can be adjusted independently of the bearing tension, and each of the two settings can be fixed by respective shim washers, i.e., first and second shim washers. The shaft unit is pre-assembled and can therefore be mounted in the bearing.

According to example embodiments, the shaft unit has a bushing part, e.g., a hook bushing, in which the outer ring of the first bearing and the outer ring of the second bearing are accommodated. For example, one of the outer rings of the first bearing is set against a projection projecting radially inwards formed on the bushing part. Thus, the bushing part accommodates both outer rings and provides a first stop with a ring region projecting radially inwards. The second stop is effected by the base ring plate, which is pressed onto the bushing part with screws and thus determines the distance of the outer ring of the second bearing via interposed shim washers, thereby adjusting the bearing tension.

According to example embodiments, the inner ring of the first bearing and the inner ring of the second bearing are mounted on the shaft, and the inner ring of the first bearing is set against a shaft step of the shaft or is set against a ring which is set against a shaft step of the shaft. Thus, the inner rings can be limited axially.

According to example embodiments, a round plate screwed into the end face of the shaft axially limits the inner ring of the second bearing. For example, the inner ring of the first bearing is axially directly adjacent to the inner ring of the second bearing. Thus, the inner rings can be limited axially.

According to example embodiments, a base ring plate is held pressed onto the bushing part by screws, and the screws protrude through the base ring plate and are screwed into axially oriented threaded holes of the bushing part. Thus, the distance between the base ring plate and the outer ring of the second bearing can be reduced by an interposed shim washer or shim washers.

According to example embodiments, the first bearing is arranged as an angular contact bearing and the second bearing is arranged as an angular contact bearing. Thus, high transverse forces of the angular step can be diverted.

According to example embodiments, the first shim washer or the first shim washers are arranged axially between the outer ring of the second bearing and the base ring plate. Thus, the distance and also the bearing tension can be adjusted by the wall thickness of the shim washers.

According to example embodiments, e.g., for adjusting the bearing preload, the base ring plate has axially through-going threaded holes for adjusting screws, e.g., adjusting screws which press on the outer ring of the second bearing. Thus, the distance can be adjusted by the adjusting screws before the shim washers are inserted, and the wall thickness of the shim washers which are to be inserted after removal of the adjusting screws is determined.

According to example embodiments, the base ring plate has axially throughgoing holes for a feeler gauge or for a depth gauge, e.g., a feeler gauge or depth gauge with which the distance between the base ring plate and the outer ring of the second bearing can be determined. Thus, the spacing and the wall thickness of the shim washers to be inserted can be determined.

According to example embodiments, the base ring plate has radially oriented cut-outs on its outer circumference. For example, a first of the cut-outs exposes the mouth of an oil hole, and/or, in the circumferential angular region covered by the oil hole, the radial distance region covered by the oil hole is radially spaced from the radial distance region covered by the base ring plate. Thus, oil can be supplied to the free space between the base ring plate and the bearing cover.

According to example embodiments, a wheel, e.g., a bevel gear or face-geared wheel, is mounted on the shaft and set against a shaft shoulder, and a spacer sleeve on the side facing axially away from the shaft shoulder is pressed against the wheel by the ring part. For example, the base ring plate presses the inner ring of the second bearing towards the inner ring of the first bearing, which is pressed onto the ring part. Thus, a spacing of the first bearing from the wheel can be achieved, and the same housing can be used for different variants of gears, e.g., larger driving pinions that allow shifting of the axial position.

According to example embodiments, a third bearing is mounted on the shaft on the side of the wheel facing away from the first and second bearings. Thus, this third bearing can be provided as a non-locating bearing, e.g., as a non-locating bearing arranged as a cylindrical roller bearing or spherical roller bearing, and the other two bearings form a common locating bearing. The first bearing and second bearing can be accommodated together in the same housing wall of the gearing, and the wall thickness of said housing wall is greater than the sum of the wall thickness of the inner ring of the first bearing and the inner ring of the second bearing.

According to example embodiments, the bushing part is accommodated and/or inserted in the first, e.g., semi-cylindrical, cut-out of the lower part, and/or the third bearing of the shaft is accommodated and/or inserted in a further, e.g., semi-cylindrical, cut-out for holding the lower part. Thus, the shaft unit can be lowered from above onto the lower part and can be accommodated there, e.g., on two opposite housing walls of the gearing.

According to example embodiments, the base ring plate is pressed towards the lower part by further screws passing through the base ring plate, and one or more second shim washers are arranged between the base ring plate and the lower part. For example, the base ring plate has axially throughgoing threaded holes through which adjusting screws project which are supported on the lower part, and has further axially throughgoing holes through which the distance between the base ring plate and the lower part can be determined by a feeler gauge. Thus, the base ring plate and the lower part can be readily connected.

According to example embodiments, a bearing cover is connected to the lower part in a tight, e.g., oil-tight, manner by screws, e.g., for covering the base ring plate, and a free space is formed between the base ring and the bearing cover, which is at least partially filled with oil. For example, the region covered by the bearing cover in the axial direction includes the region covered by the base ring plate in the axial direction and/or the radial distance region covered by the bearing cover includes the radial distance region covered by the base ring plate. Thus, the bearing cover covers an oil-filled free space from which the second bearing can be supplied with oil. In contrast, the first bearing can be supplied from the oil sump in the interior region of the gearing.

According to an example embodiment of the present invention, in a method for producing a gearing, a pre-assembled shaft unit is produced, in which a first and a second bearing are mounted onto a shaft and then their outer rings are braced with respect to one another, e.g., by a bushing part, which accommodates the outer rings, and a base ring plate, using one or more first shim washers for adjusting the bracing, e.g., the bearing tension. Thereafter, the shaft unit is inserted into a lower part of the housing of the gearing, and the relative axial position of the shaft unit with respect to the lower part is determined by inserting one or more second shim washers between the base ring plate and the lower part. For example, the axial position is determined by assessing the contact pattern of a gear pair formed by a gear connected to the shaft in a rotationally fixed manner and a pinion, e.g., a bevel pinion, of the gearing mounted rotatably in the housing.

Thus, the bearing tension is adjusted first, and the shaft unit is formed pre-assembled with bearing tension. The bearing tension is independent of the axial positioning of the shaft unit in the gearing. This means that for adjusting the contact pattern of the first gear stage, no influence of the bearing tension is effected, but rather the axial position can be adjusted independently of the bearing tension. This means that the shaft unit is axially displaced until the contact pattern has the desired appearance. During this axial displacement, the bearing stress of the bearings supporting the shaft and forming a locating bearing, i.e., the first and second bearings, remains unchanged. The third bearing of the shaft is arranged as a non-locating bearing to compensate for thermally induced expansions. The first and second bearing have a smaller distance to the wheel than the third bearing.

Further features and aspects of example embodiments of the present invention are explained in more detail with reference to the appended schematic Figures.

DETAILED DESCRIPTION

As illustrated in the Figures, a gearing is produced, according to example embodiments of the present invention, by inserting a pre-assembled shaft unit, which is provided with a bearing tension before insertion into the gear housing, and the contact pattern of a bevel gear stage is adjusted after insertion.

The individual steps are explained in more detail below.

Figure 1:
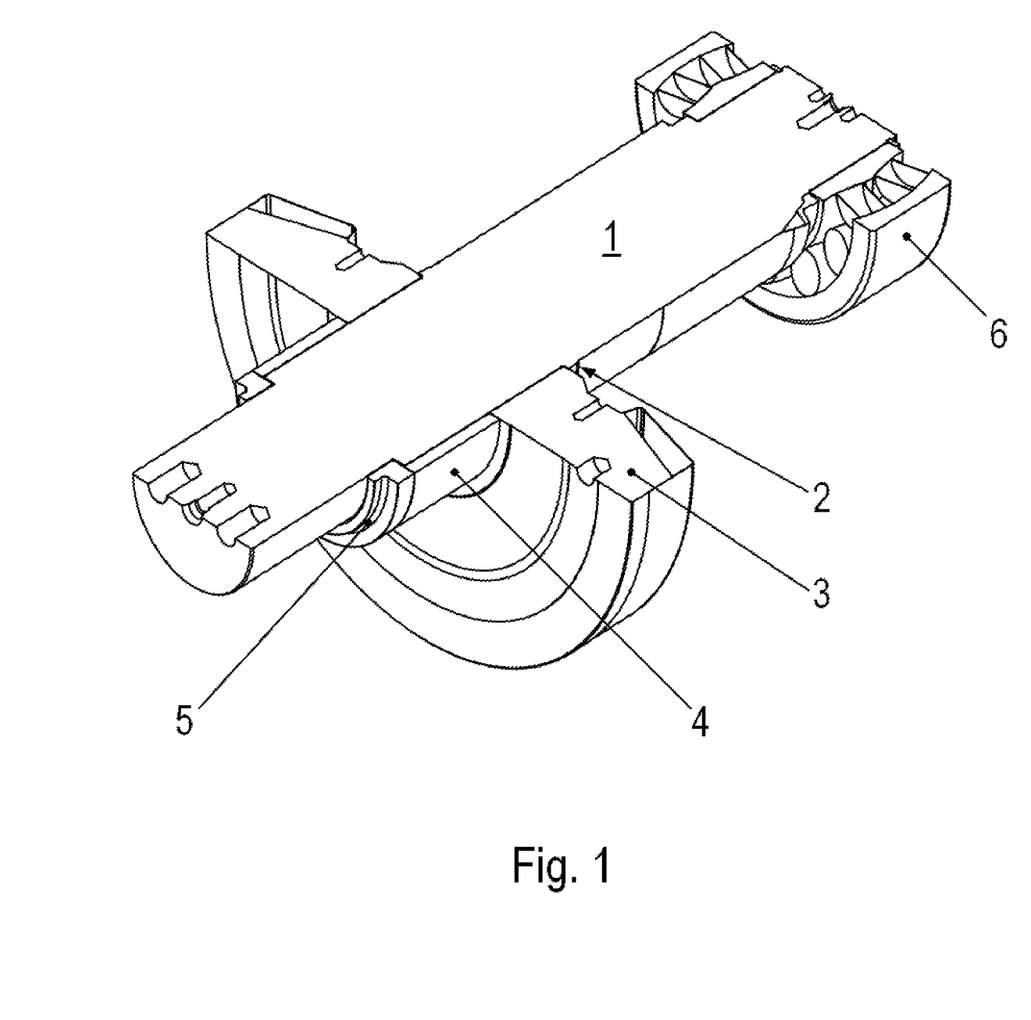
FIG. 1 illustrates a method step for pre-mounting a pre-assembled shaft unit, in which a wheel 3, a third bearing 6, and a spacer sleeve 4 are mounted on the shaft.

As illustrated in FIG. 1, a third bearing 6 is mounted on a shaft 1 until it rests against a step formed on the shaft 1. On its side facing away from this step, the third bearing 6 is axially secured by a retaining ring which snaps into an annular groove of the shaft 1.

A wheel 3, e.g., a crown wheel of the bevel gear stage of the gearing, is also mounted on the shaft 1 until it rests against a shaft shoulder 2, e.g., a second step. A spacer sleeve 4 is mounted on the shaft 1 and rests against the wheel 3. A ring part 5 is mounted on the shaft 1 and rests against a further shaft shoulder, e.g., a step, in which the inside diameter of the ring part 5 is smaller than the inside diameter of the spacer sleeve 4 and the radial distance region covered by the ring part 5 includes the radial distance region covered by the spacer sleeve 4.

Figure 2:
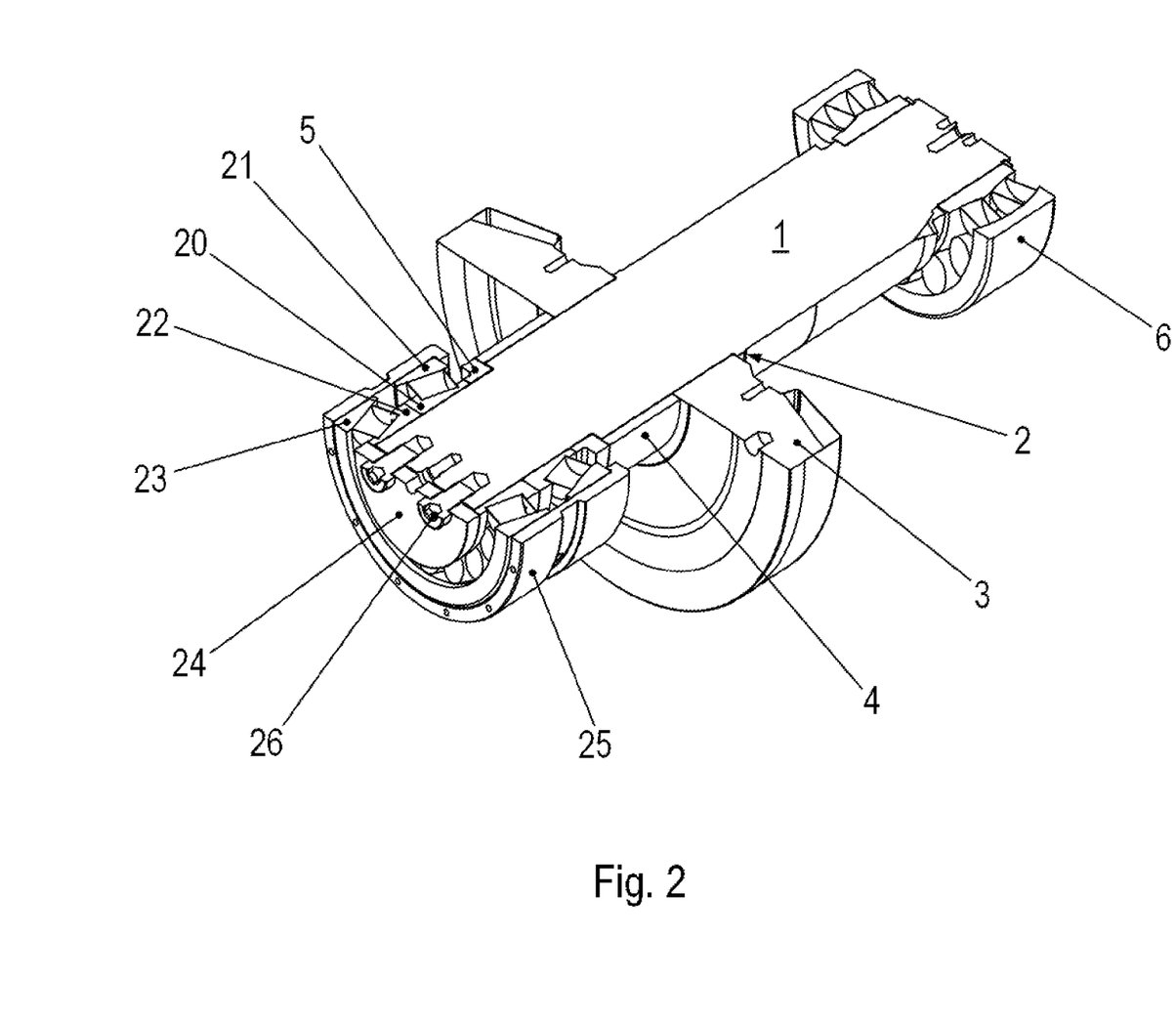
FIG. 2 illustrates a method step, in which two further bearings are mounted, the outer rings 21, 23 of which are accommodated in a bushing part 25.

As illustrated in FIG. 2, following the ring part 5, a first and a second bearing are mounted on the shaft. Here, the inner ring 20 of the first bearing is set against the ring part 5, and the inner ring 22 of the second bearing is set against the inner ring 20 of the first bearing.

A round plate 24 pressed onto the end face of the shaft 1 with screws 26 presses on the inner ring 22, which presses on the inner ring 20, which is pressed against the ring part 5.

The screws 26 are screwed into axially oriented threaded holes in the end face of the shaft 1 so that the screw heads of the screws 26 press against the round plate 24.

The outer ring 21 of the first bearing is accommodated in a bushing part 25, e.g., a hook bushing. Likewise, the outer ring 23 of the second bearing is also accommodated in this bushing part 25.

The first and second bearings are, for example, arranged as angular contact bearings, e.g., in an X arrangement.

At its first axial end region, the bushing part 25 has a ring region projecting radially inwards, e.g., a projection, against which the outer ring 21 is set.

The bushing part 25 radially surrounds the outer ring 21 and the outer ring 23 and has axially oriented threaded holes regularly spaced from one another in the circumferential direction on its end face facing away from the end region.

Figure 3:
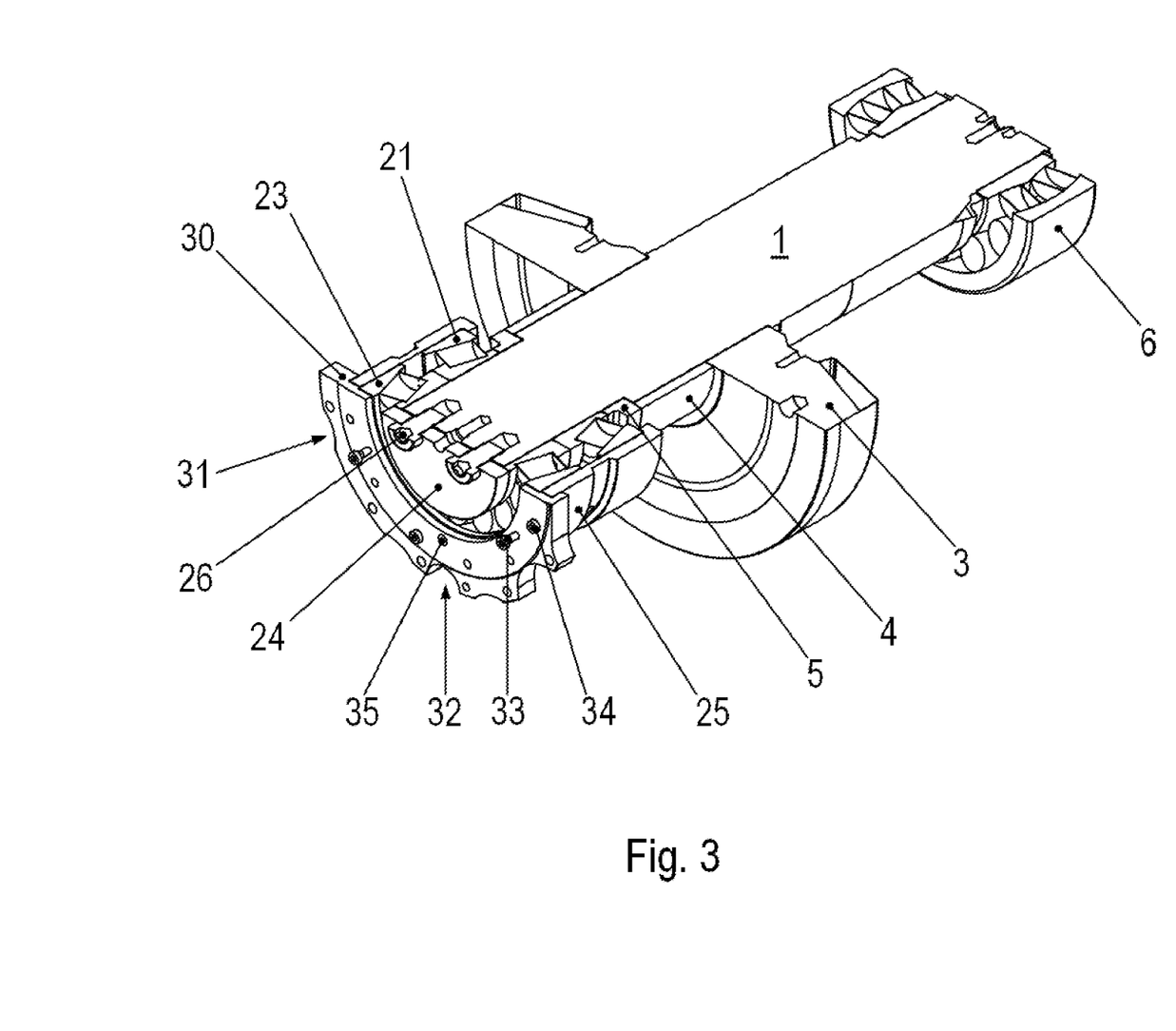
FIG. 3 illustrates a method step in which a base ring plate 30 pressing on the bushing part 25 is screwed to the shaft 1.

As illustrated in FIG. 3, a base ring plate 30 is pressed towards the end face of the bushing part 25 facing away from the ring area, e.g., from the projection, by screws 34, and the screws are screwed into axially oriented threaded holes of the bushing part 25.

However, in order to adjust the bearing tension, one or more shim washers are inserted between the bushing part 25 and the base ring plate 30. To determine the wall thickness to be applied by the shim washers, prior to inserting the shim washers, adjusting screws 33 are first screwed into threaded holes passing through the base ring plate 30 until these adjusting screws protrude toward and press on the bushing part 25 and/or until the adjusting screws press on the outer ring 23 of the second bearing.

By actuating the adjusting screws 33, this pressure is adjusted such that the desired bearing tension is achieved. During this adjustment process, a measure of bearing stress is determined using an appropriate device.

For example, a torque is determined for this purpose when the shaft 1 is rotated in a testing device and the adjusting screws are actuated such that the value of the torque reaches a set value.

Alternatively, the breakaway torque of shaft 1 is determined and the adjusting screws are actuated until the breakaway torque reaches a set value.

A further alternative is to determine only a clearance of the base ring plate 30 to the bushing part 25 or to the outer ring 23 via push-pull and to actuate the adjusting screws 33 such that the breakaway torque reaches a set value.

In this context, push-pull involves checking the clearance or the remaining axial gap by measuring the axial clearance using probes.

As a further alternative, the adjusting screws are actuated such that the bearing tension can be estimated by visual inspection, in that all the rolling elements of the first and second bearings rotate when a predetermined torque is applied to the shaft.

After the adjusting screws 33 have been actuated in such a manner, e.g., in one of the exemplary manners mentioned above, that the desired bearing tension has been set, the axial distance between the base ring plate 30 and the outer ring 23 is determined and/or recorded through a hole 35 passing axially through the base ring plate 30 by a feeler gauge or by another measuring device.

Thereafter, the adjusting screws 33 are removed and one or more shim washers are installed between the base ring plate 30 and outer ring 23. When the screws 34 are screwed on, the screw heads of the screws 34 thus press on the base ring plate 30, which thus via the shim washers presses on the outer ring 23, which thus via the rolling elements of the second bearing presses the inner ring 22 on the inner ring 21, which in turn via the rolling elements of the first bearing presses the outer ring 21 of the first bearing against the ring area of the bushing part 25. The bushing part 25 is connected to the base ring plate 30 by the screws 34.

Figure 4:
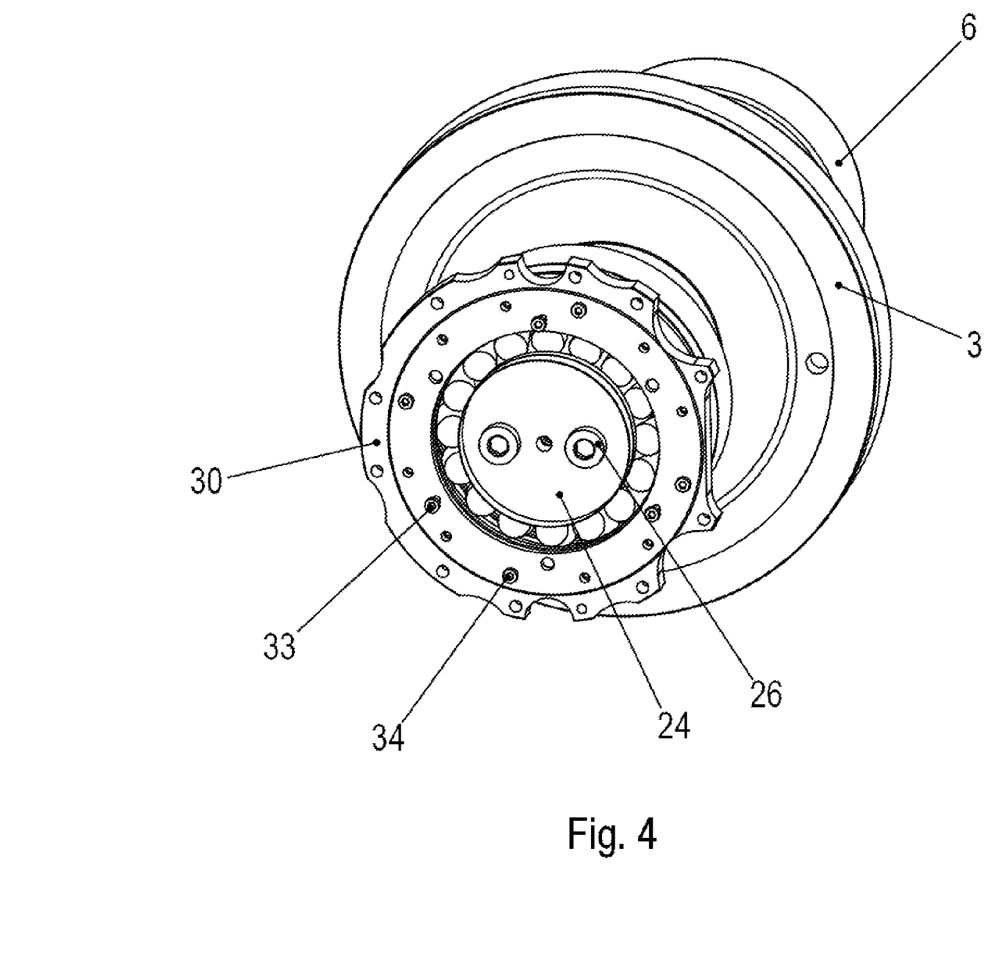
FIG. 4 is a perspective view of the pre-assembled shaft unit.
Figure 5:
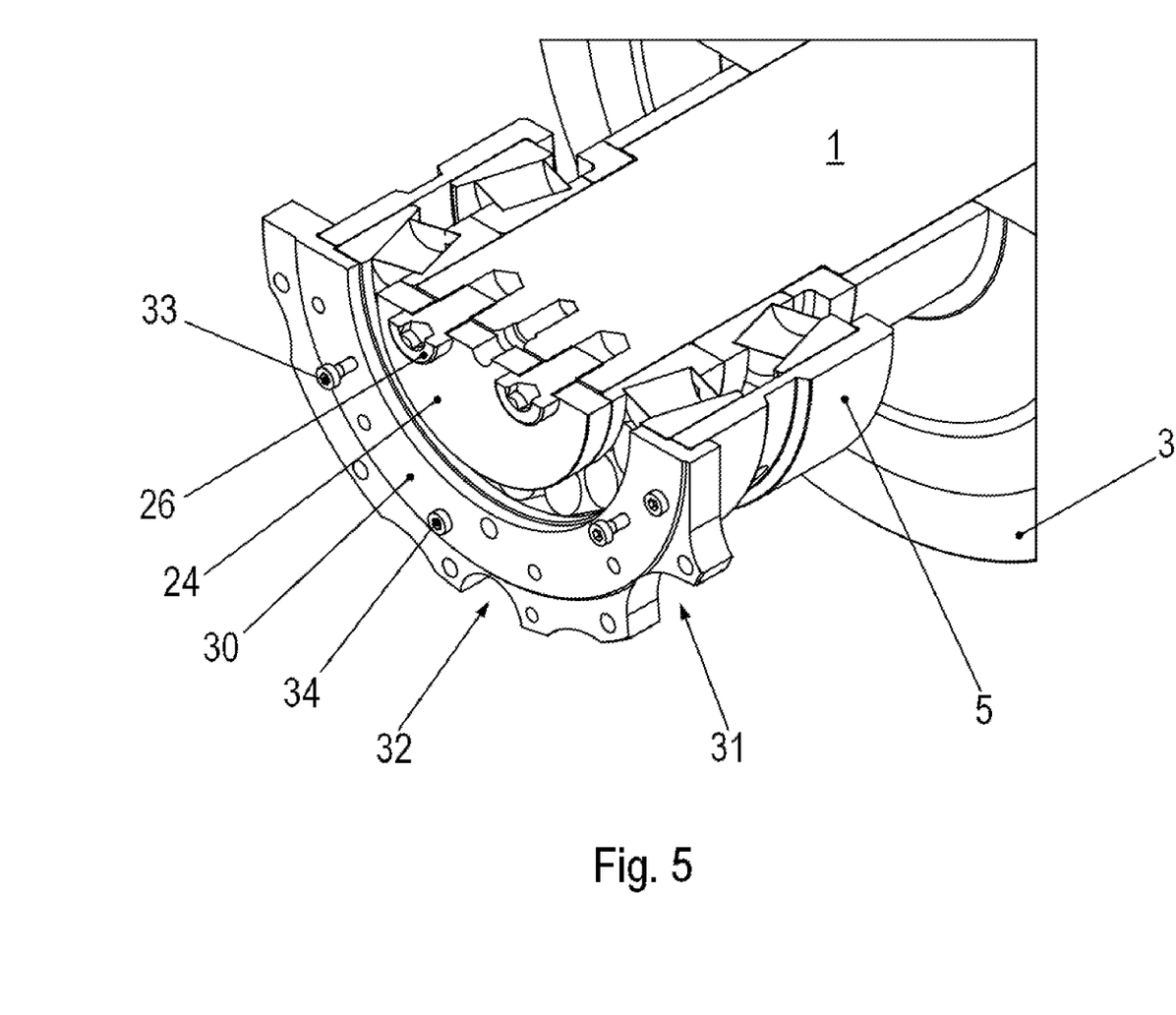
FIG. 5 is a cross-sectional view of the shaft unit.

FIG. 4 and FIG. 5 are further views in this regard.

As illustrated, the base ring plate 30 has radially oriented cut-outs 31 and 32, e.g., recesses, on its radial outer circumference. The function of these cut-outs 31 and 32 is clearly illustrated in the further Figures. Because the cut-out 32 creates free space for the mouth region of an oil pipe and the cut-out 31 creates free space for the actuation of screws.

Figure 6:
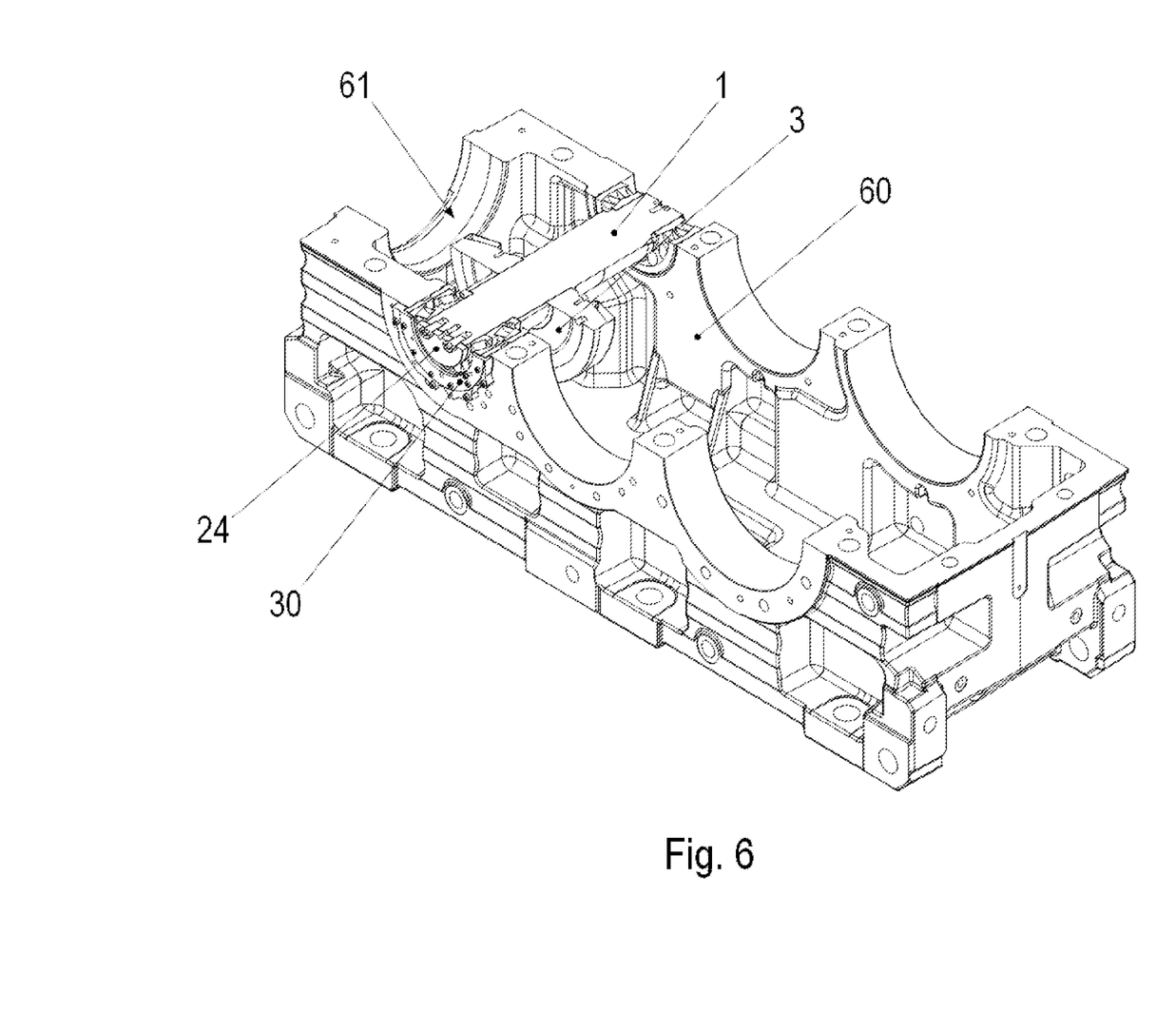
FIG. 6 is a cross-sectional view of the shaft unit inserted into a lower part 60 of the housing of a gearing.

After producing this pre-assembled shaft unit, it is inserted into the lower part 60 of the housing of the gearing, as illustrated in FIG. 6.

Because the housing of the gearing has a lower part 60 and an upper part 110 which can be mounted thereon.

The lower part 60 has semicircular machined bearing holders for the third bearing 6 and the first bearing, as well as for the second bearing. The outer rings of the respective bearings can be lowered into these semicircular recesses and can thus be accommodated therein.

As illustrated in FIG. 6, after the pre-assembled shaft unit has been accommodated, the wheel 3 is arranged such that a bevel pinion, the axis of rotation of which is aligned perpendicularly to the axis of rotation of the shaft 1, can be accommodated in a further semicircular recess 61 together with the driving shaft of the gearing connected to this bevel pinion and the further bearing mounted thereon.

Thus, the driving gear stage can be arranged as a bevel gear stage.

Figure 11:
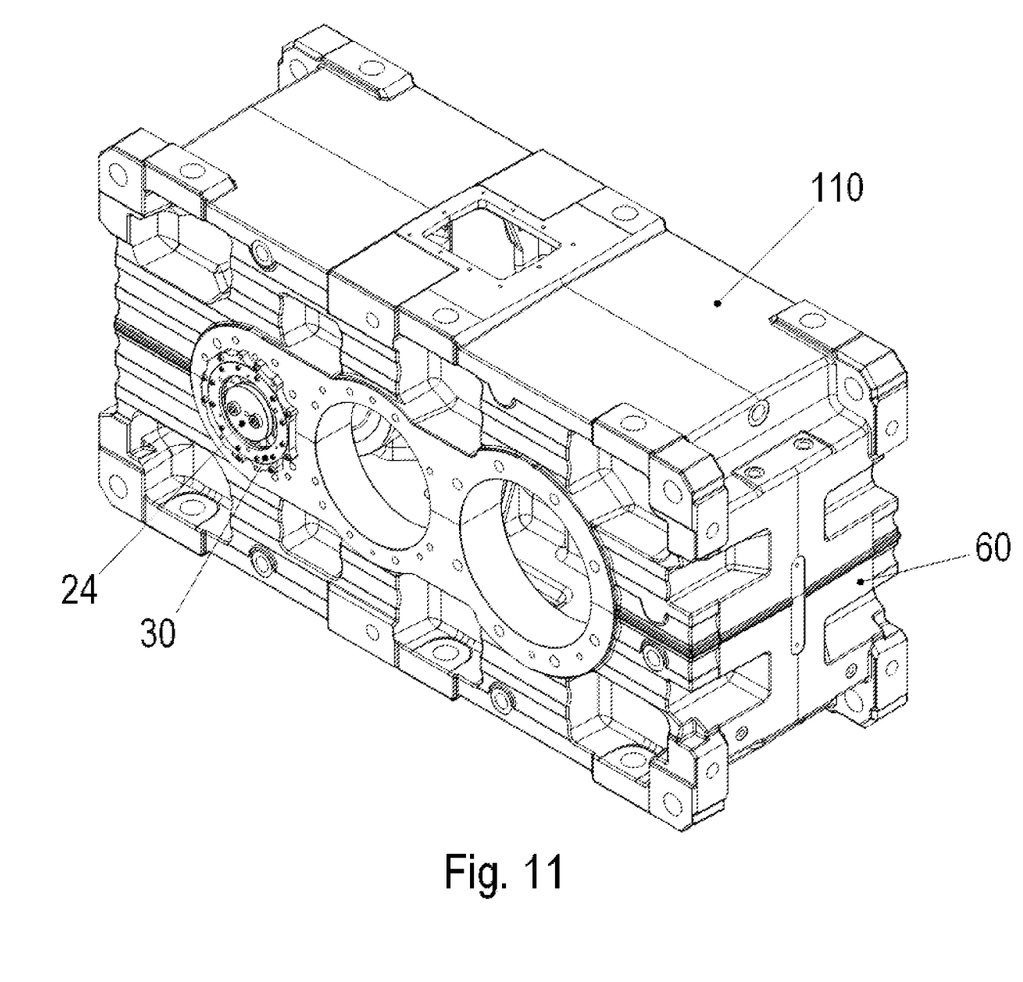
FIG. 11 is a perspective view of the gearing, in which, in contrast to FIG. 9, the upper part 110 is arranged on the lower part 60.
Figure 12:
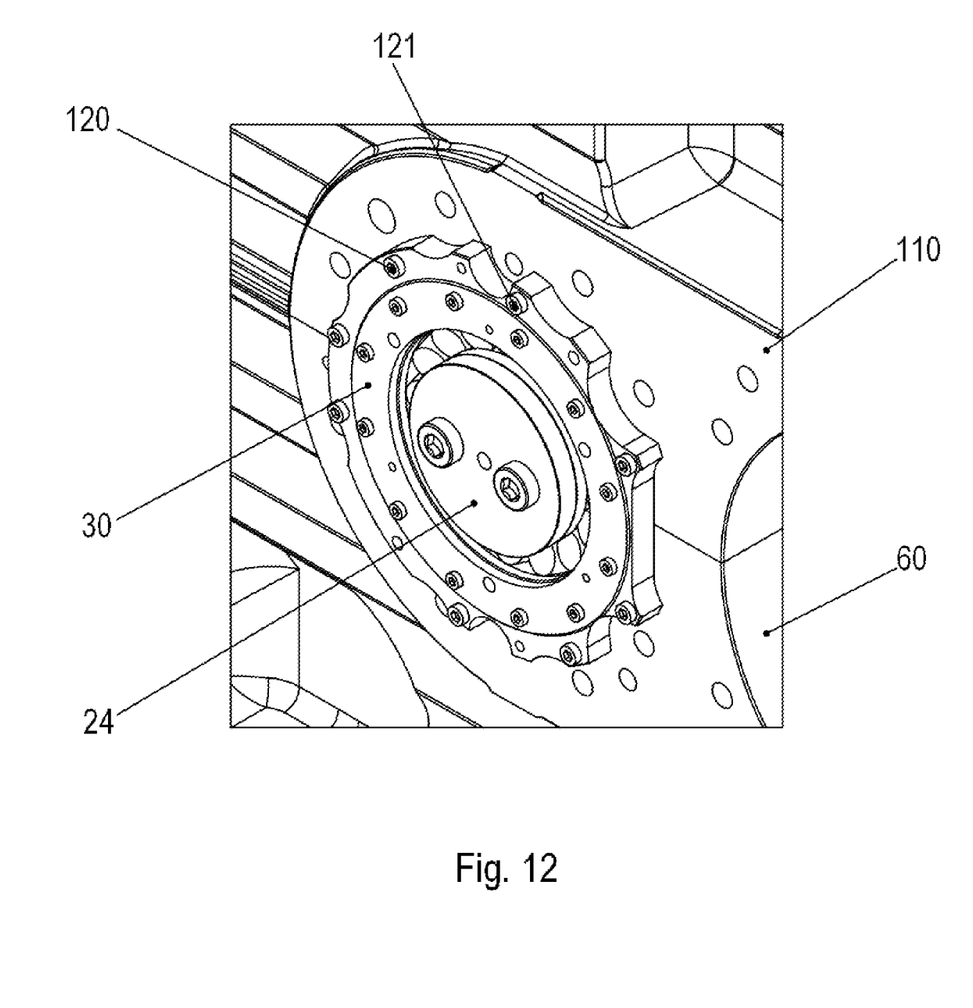
FIG. 12 is an enlarged section of FIG. 11.

The upper part 110 is placed on the lower part 70 and connected thereto.

Figure 7:
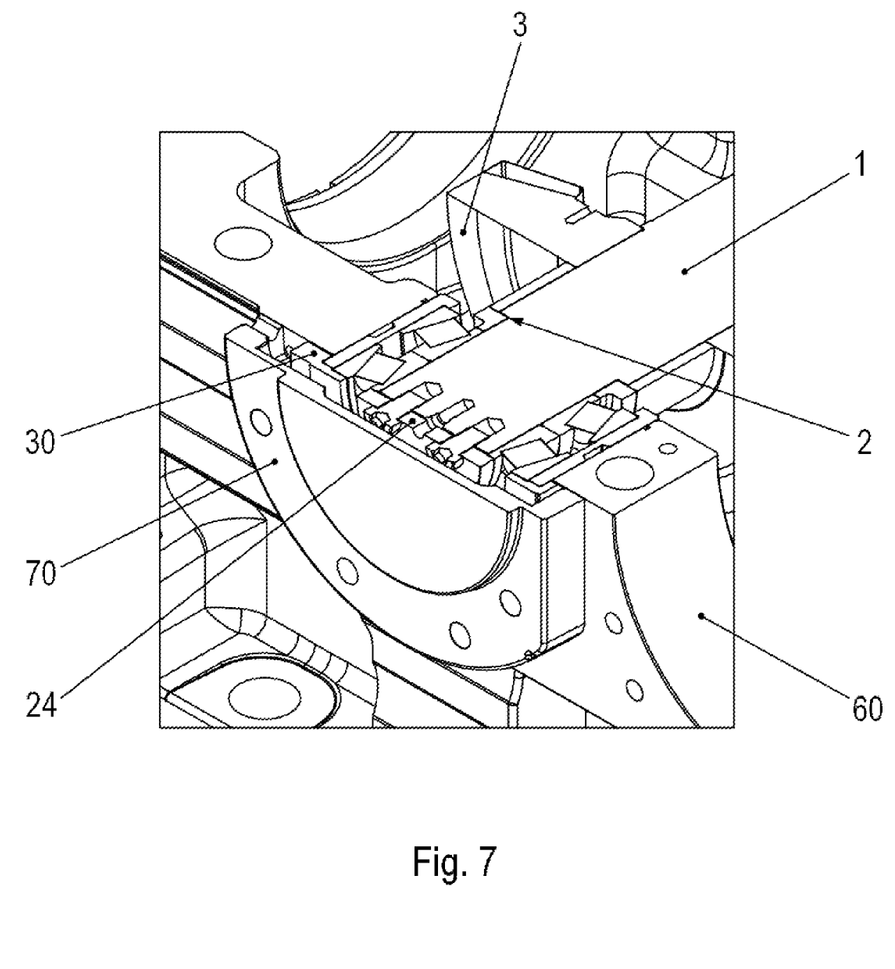
FIG. 7 is a cross-sectional view of a section of the gearing with the bearing cover 70 mounted.
Figure 8:
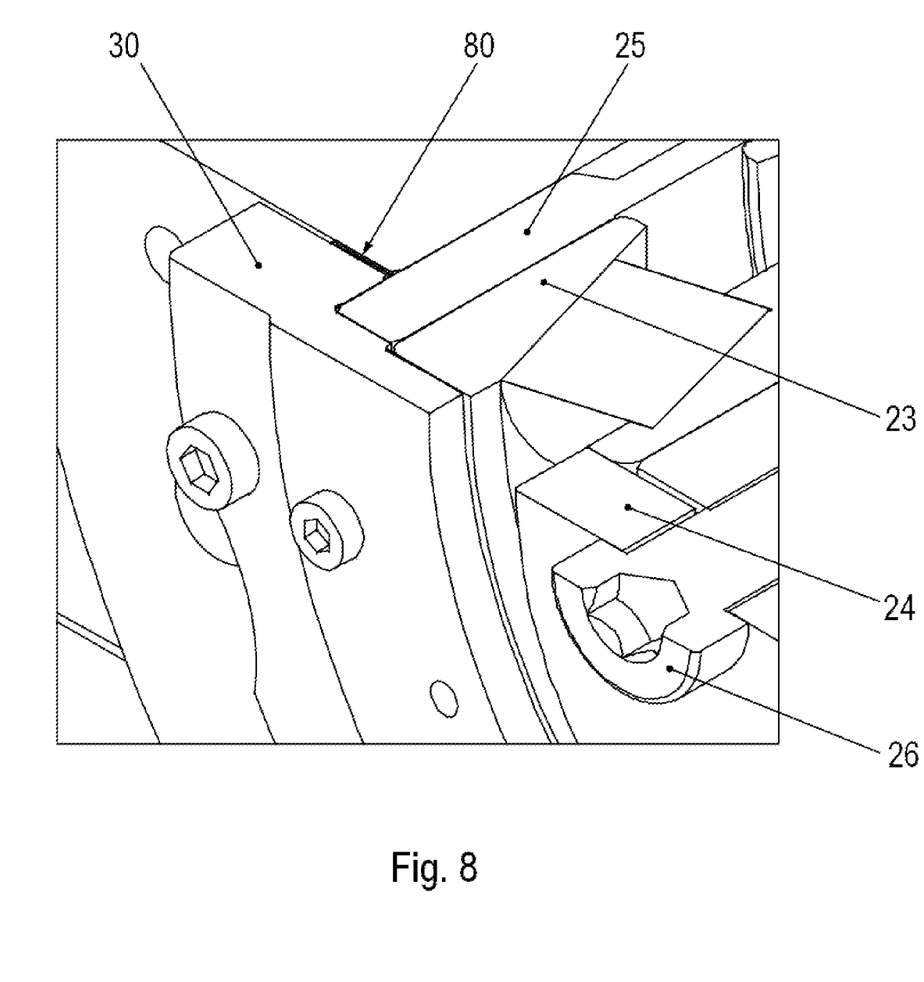
FIG. 8 is an enlarged section of FIG. 6.
Figure 9:
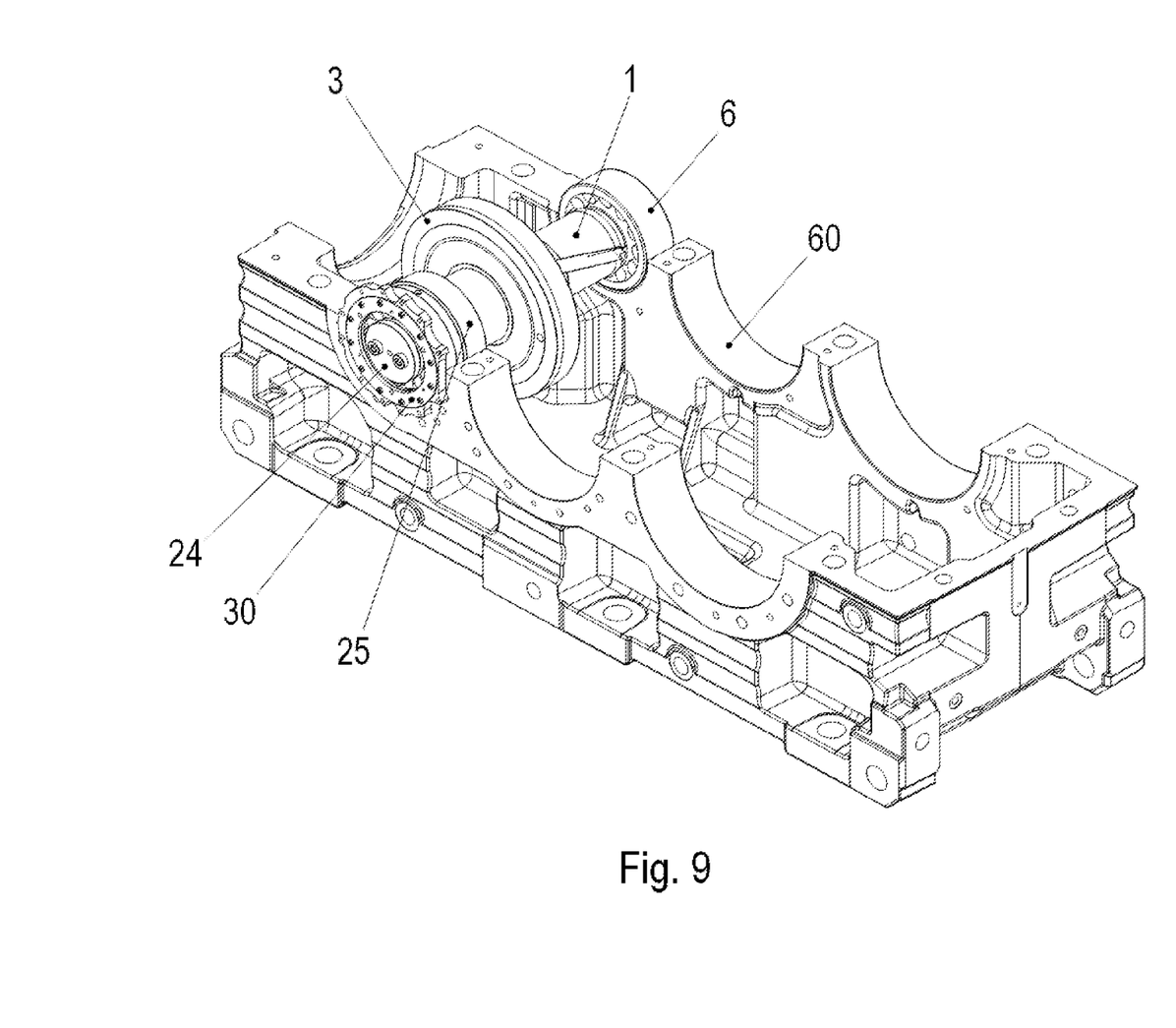
FIG. 9 illustrates the shaft unit inserted into a lower part 60 of the housing of a gearing.
Figure 10:
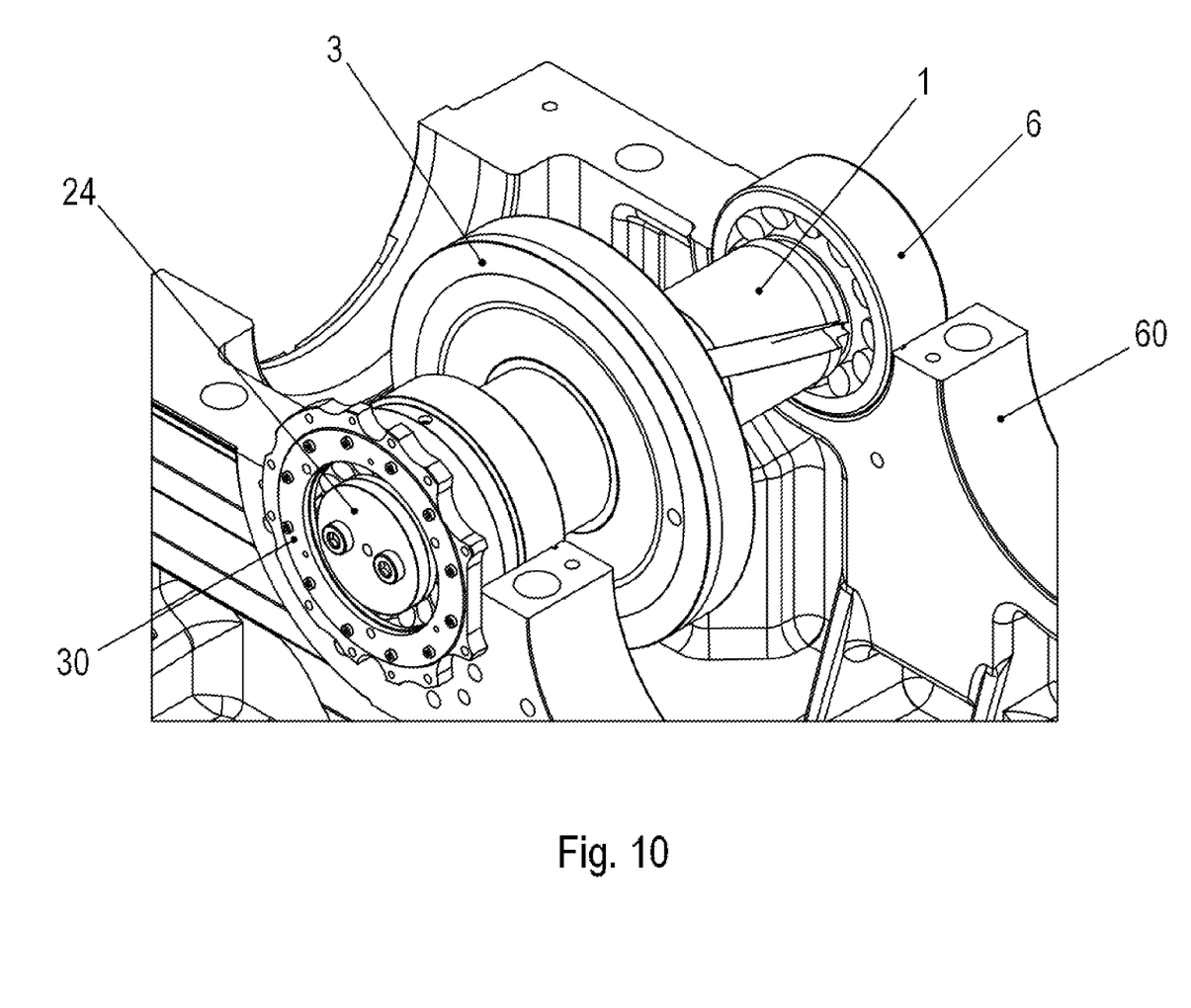
FIG. 10 is an enlarged section of FIG. 9.

As illustrated in FIG. 7, a bearing cover 70 is screwed to the lower part 60 and the upper part 110 connected thereto for covering. This covers the base ring plate 30 and is spaced from the base ring plate 30. In this manner, an intermediate space is provided between the base ring plate 30 and the bearing cap 70 for oil to flow into, which space can be pressurized with oil to lubricate the first and second bearings. This oil enters the intermediate space from the oil sump of the gearing arranged in the lower part 60 through a hole passing through the lower part 60.

The radial distance region covered by the bearing cover 70, again with respect to the axis of rotation of the shaft 1, includes the radial distance region covered by the base ring plate 30 and also the radial distance region covered by the first and second bearings.

The bearing cover 70 is tightly connected to the lower part, i.e., provided with an interposed seal. The seal between the bearing cover 70 and the upper part 110 is likewise arranged.

Second shim washers 80 are arranged between the base ring plate 30 and the lower part 60. Thus, the axial position of the entire pre-assembled unit can be adjusted by the wall thickness of the selected second shim washers 80. This wall thickness is determined depending on the contact pattern of the meshing gear pair, which includes the bevel pinion and the wheel 3.

For example, a coloring of the meshing region of the toothing of one of the two toothing partners, i.e., the bevel pinion or the wheel 3, is carried out and then the pinion is rotated with the adjusted spacing so that a contact pattern can be determined. By changing the spacing as specifically as possible, the desired contact pattern can be obtained and thus the necessary wall thickness of the second shim washers 80 is determined.

The change is achievable either by successive insertion of second shim washers 80 of varying thicknesses, or again by using adjusting screws which are screwed into the base ring plate 30 and are supported on the lower part 60. Through further holes passing through the base ring plate 30, the distance between the base ring plate 30 and the lower part 60 can be determined with a feeler gauge and thus the necessary wall thickness can be determined.

The base ring plate 30 is pressed towards the lower part by screw heads of screws screwed into axially oriented threaded holes of the lower part, i.e., pressed onto the lower part 60 via the second shim washers 80.

The axial direction, the radial distance and the circumferential direction or the circumferential angle always refer to the rotational axis of shaft 1.

In further example embodiments, a device for fixing the distance is used instead of the shim washers. For the sake of simplicity, these are subsumed here under the term shim washers.

LIST OF REFERENCE NUMERALS

1 Shaft
2 Shaft shoulder
3 Wheel, e.g., crown wheel of the bevel gear stage
4 Spacer sleeve
5 Ring part
6 Bearing
20 Inner ring
21 Outer ring
22 Inner ring
23 Outer ring
24 Round plate
25 Bushing part, e.g., hook bushing
26 Screw
30 Base plate
31 Cut-out
32 Cut-out
33 Adjusting screw
34 Screw
35 Hole
60 Lower part
61 Further semicircular recess
70 Bearing cover
80 Second shim washer
110 Upper part
120 Screw
121 Adjusting screw

The invention claimed is:

1. A gearing, comprising
a shaft unit including a shaft and first and second bearing mounted on the shaft, outer rings of the first and second bearings being braced with respect to one another, the shaft unit including at least one first shim washer adapted to adjust the bracing;
a housing including a lower part and an upper part arranged on the lower part, the lower part including at least one first cut-out adapted to hold the shaft unit, the upper part including at least one second cut-out, the first and the second cut-out forming a bearing holder; and
at least one second shim washer adapted to adjust an axial position of the shaft unit;
wherein the shaft unit includes a bushing part accommodating the outer ring of the first bearing and the outer ring of the second bearing;
wherein a base ring plate is pressed onto the bushing part by screws that protrude through the base ring plate and are screwed into axially oriented threaded holes of the bushing part; and
wherein the base ring plate includes axially throughgoing threaded holes for adjusting screws that press on the outer ring of the second bearing.

2. A gearing, comprising
a shaft unit including a shaft and first and second bearing mounted on the shaft, outer rings of the first and second bearings being braced with respect to one another, the shaft unit including at least one first shim washer adapted to adjust the bracing;
a housing including a lower part and an upper part arranged on the lower part, the lower part including at least one first cut-out adapted to hold the shaft unit, the upper part including at least one second cut-out, the first and the second cut-out forming a bearing holder; and
at least one second shim washer adapted to adjust an axial position of the shaft unit;
wherein the shaft unit includes a bushing part accommodating the outer ring of the first bearing and the outer ring of the second bearing;
wherein a base ring plate is pressed onto the bushing part by screws that protrude through the base ring plate and are screwed into axially oriented threaded holes of the bushing part; and
wherein the base ring plate includes axially throughgoing holes for a feeler gauge adapted to determine a distance between the base ring plate and the outer ring of the second bearing.

3. A gearing, comprising
a shaft unit including a shaft and first and second bearing mounted on the shaft, outer rings of the first and second bearings being braced with respect to one another, the shaft unit including at least one first shim washer adapted to adjust the bracing;
a housing including a lower part and an upper part arranged on the lower part, the lower part including at least one first cut-out adapted to hold the shaft unit, the upper part including at least one second cut-out, the first and the second cut-out forming a bearing holder; and
at least one second shim washer adapted to adjust an axial position of the shaft unit;
wherein the shaft unit includes a bushing part accommodating the outer ring of the first bearing and the outer ring of the second bearing;
wherein a base ring plate is pressed onto the bushing part by screws that protrude through the base ring plate and are screwed into axially oriented threaded holes of the bushing part; and
wherein the base ring plate includes radially oriented cut-outs on its outer circumference.

4. The gearing according to claim 3, wherein the first and second cut-outs are arranged as a semi-cylindrical cut-outs, the bearing holder being arranged as a complete and/or a cylindrical bearing holder, the first shim washer adapted to adjust a bearing tension of the gearing.

5. The gearing according to claim 3, wherein the inner ring of the first bearing and the inner ring of the second bearing are mounted on the shaft, and the inner ring of the first bearing is set against a shaft step of the shaft and/or is set against a ring that is set against a shaft step of the shaft.

6. The gearing according to claim 3, wherein a round plate screwed into an end face of the shaft axially limits the inner ring of the second bearing.

7. The gearing according to claim 6, wherein the inner ring of the first bearing is axially directly adjacent to an inner ring of the second bearing.

8. The gearing according to claim 3, wherein the first bearing is arranged as an angular contact bearing and the second bearing is arranged as an angular contact bearing.

9. The gearing according to claim 3, wherein a first of the cut-outs exposes a mouth of an oil hole and/or, in a circumferential angular region covered by the oil hole, a radial distance region covered by the oil hole is radially spaced from a radial distance region covered by the base ring plate.

10. The gearing according to claim 3, wherein (a) a wheel, (b) a bevel gear, and/or (c) face-geared wheel is arranged on the shaft and set against (a) a shaft shoulder, (b) a spacer sleeve, and/or (c) a retaining ring, and wherein a spacer sleeve on a side facing axially away from the shaft shoulder is pressed against the wheel by a ring part.

11. The gearing according to claim 10, wherein a base ring plate presses an inner ring of the second bearing toward an inner ring of the first bearing, which is pressed onto the ring part.

12. The gearing according to claim 3, wherein a bearing cover is connected to the lower part in a tight and/or oil-tight manner by screws.

13. The gearing according to claim 12, wherein a free space is formed between a base ring and the bearing cover, the free space adapted to be at least partially filled with oil.

14. The gearing according to claim 12, wherein a region covered by the bearing cover in an axial direction includes a region covered by a base ring plate in the axial direction and/or wherein a radial distance region covered by the bearing cover includes a radial distance region covered by the base ring plate.

15. A method for producing a gearing as recited in claim 3, comprising:
  producing a pre-assembled shaft unit including the first bearing and the second bearing mounted onto the shaft and bracing the outer rings of the first and second bearings with respect to one another by a bushing part that accommodates the outer rings and by a base ring plate, the at least one first shim washer adjusting the bracing; and
  after the producing, inserting the shaft into the lower part of the housing of the gearing and adjusting a relative axial position of the shaft unit with respect to the lower part by inserting the at least one second shim washer between the base ring plate and the lower part.

16. A gearing, comprising
  a shaft unit including a shaft and first and second bearing mounted on the shaft, outer rings of the first and second bearings being braced with respect to one another, the shaft unit including at least one first shim washer adapted to adjust the bracing;
  a housing including a lower part and an upper part arranged on the lower part, the lower part including at least one first cut-out adapted to hold the shaft unit, the upper part including at least one second cut-out, the first and the second cut-out forming a bearing holder; and
  at least one second shim washer adapted to adjust an axial position of the shaft unit;
  wherein (a) a wheel, (b) a bevel gear, and/or (c) face-geared wheel is arranged on the shaft and set against (a) a shaft shoulder, (b) a spacer sleeve, and/or (c) a retaining ring, and wherein a spacer sleeve on a side facing axially away from the shaft shoulder is pressed against the wheel by a ring part; and
  wherein a third bearing is mounted on the shaft on a side of the wheel facing away from the first and second bearings.

17. The gearing according to claim 16, wherein the shaft unit includes a bushing part accommodating the outer ring of the first bearing and the outer ring of the second bearing.

18. The gearing according to claim 17, wherein the bushing part is arranged as a hook bushing.

19. The gearing according to claim 17, wherein the outer ring of the first bearing is set against a projection projecting radially inwardly arranged on the bushing part.

20. The gearing according to claim 17, wherein a base ring plate is pressed onto the bushing part by screws that protrude through the base ring plate and are screwed into axially oriented threaded holes of the bushing part.

21. The gearing according to claim 20, wherein the first shim washer is arranged axially between the outer ring of the second bearing and the base ring plate.

22. The gearing according to claim 20, wherein the base ring plate is pressed toward the lower part by further screws passing through the base ring plate, at least one second shim washer being arranged between the base ring plate and the lower part.

23. The gearing according to claim 17, wherein the bushing part is accommodated and/or inserted in the first cut-out of the lower part.

24. The gearing according to claim 16, wherein the third bearing has a same outer diameter as a bushing part to achieve a symmetrical structure of the housing.

25. The gearing according to claim 16, wherein the third bearing of the shaft is accommodated and/or inserted in a further cut-out for holding the lower part.

26. The gearing according to claim 25, wherein the third bearing has a same outer diameter as a bushing part to achieve a symmetrical structure of the housing.

27. A gearing, comprising
  a shaft unit including a shaft and first and second bearing mounted on the shaft, outer rings of the first and second bearings being braced with respect to one another, the shaft unit including at least one first shim washer adapted to adjust the bracing;
  a housing including a lower part and an upper part arranged on the lower part, the lower part including at least one first cut-out adapted to hold the shaft unit, the upper part including at least one second cut-out, the first and the second cut-out forming a bearing holder; and
  at least one second shim washer adapted to adjust an axial position of the shaft unit;
  wherein the shaft unit includes a bushing part accommodating the outer ring of the first bearing and the outer ring of the second bearing;
  wherein a base ring plate is pressed onto the bushing part by screws that protrude through the base ring plate and are screwed into axially oriented threaded holes of the bushing part;
  wherein the base ring plate is pressed toward the lower part by further screws passing through the base ring plate, at least one second shim washer being arranged between the base ring plate and the lower part; and wherein the base ring plate includes axially throughgoing threaded holes through which adjusting screws project which are supported on the lower part, and has further axially throughgoing holes through which a distance between the base ring plate and the lower part is determinable by a feeler gauge.

28. A method for producing a gearing, comprising:
producing a pre-assembled shaft unit including a first bearing and a second bearing mounted onto a shaft and bracing outer rings of the first and second bearings with respect to one another by a bushing part that accommodates the outer rings and by a base ring plate, at least one first shim washer adjusting the bracing; and
after the producing, inserting the shaft into a lower part of a housing of the gearing and adjusting a relative axial position of the shaft unit with respect to the lower part by inserting at least one second shim washer between the base ring plate and the lower part;

wherein the shaft unit includes a bushing part accommodating the outer ring of the first bearing and the outer ring of the second bearing;
wherein a base ring plate is pressed onto the bushing part by screws that protrude through the base ring plate and are screwed into axially oriented threaded holes of the bushing part; and
wherein the base ring plate includes axially throughgoing threaded holes for adjusting screws that press on the outer ring of the second bearing.

29. The method according to claim 28, wherein the bracing includes adjusting a bearing tension.

30. The method according to claim 28, wherein the adjusting includes assessing a contact pattern of a gear pair formed by a wheel connected to the shaft in a rotationally fixed manner and a pinion and/or a bevel pinion of the gearing mounted rotatably in the housing.

* * * * *